March 22, 1966 R. TEMPLE 3,241,637
EMERGENCY BRAKING AND LOCKING UNIT
Filed Dec. 26, 1962 2 Sheets-Sheet 1
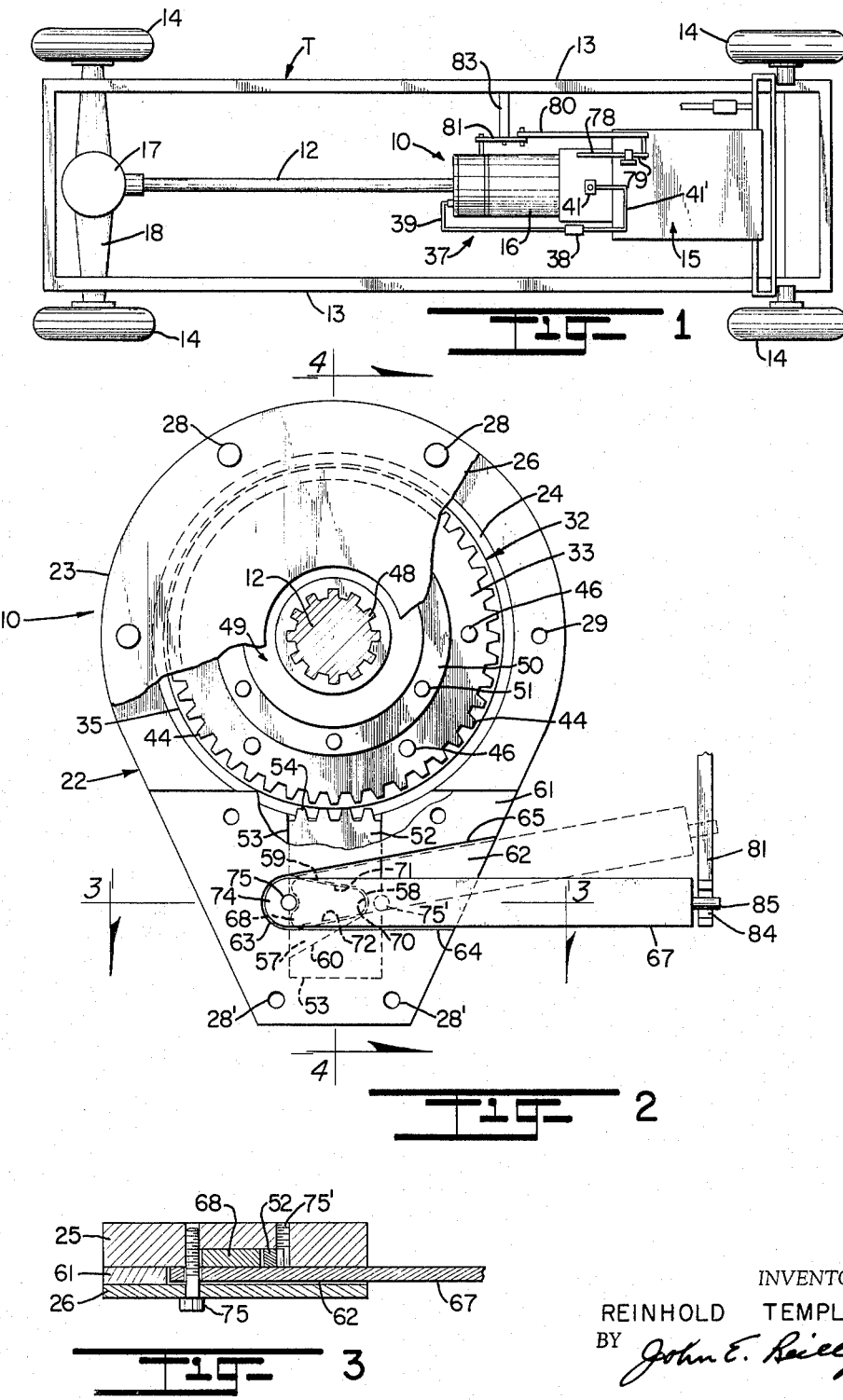
INVENTOR.
REINHOLD TEMPLE
BY John E. Reilly
ATTORNEY March 22, 1966 R. TEMPLE 3,241,637
EMERGENCY BRAKING AND LOCKING UNIT
Filed Dec. 26, 1962 2 Sheets-Sheet 2
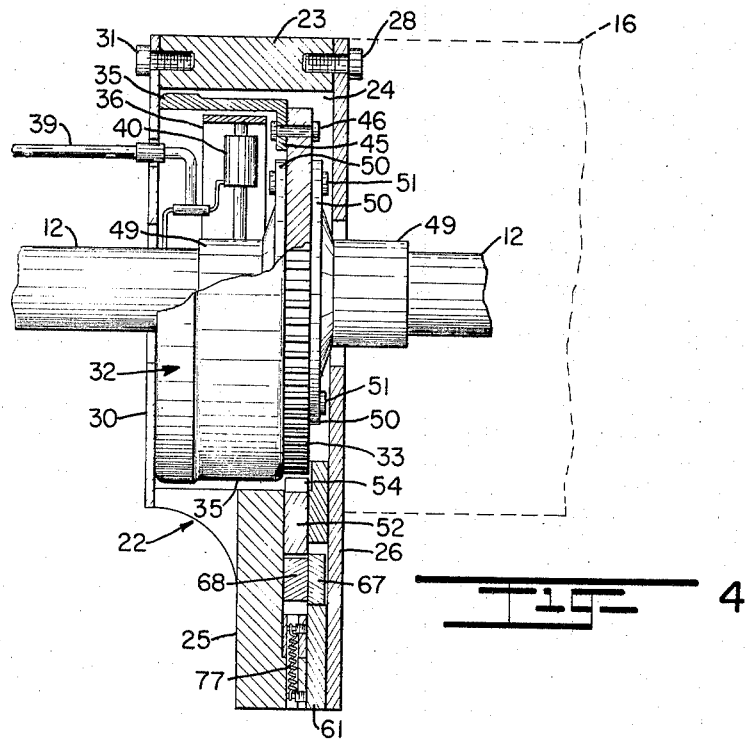
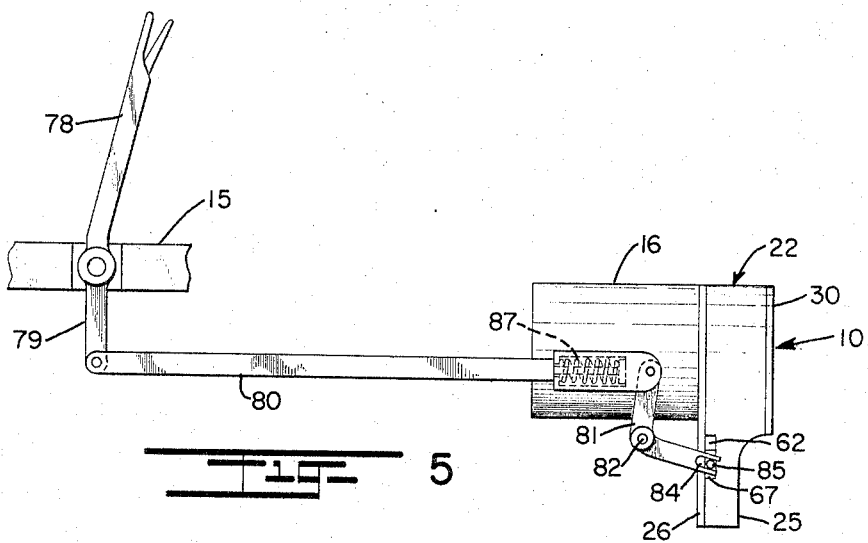
INVENTOR.
REINHOLD TEMPLE
BY John E. Reilly
ATTORNEY

United States Patent Office 3,241,637
Patented Mar. 22, 1966

3,241,637
EMERGENCY BRAKING AND LOCKING UNIT
Reinhold Temple, 3366 Niagara, Denver, Colo.
Filed Dec. 26, 1962, Ser. No. 247,265
1 Claim. (Cl. 188—69)

This invention relates to a new and improved auxiliary brake and locking device, and more particularly relates to an emergency braking and locking device for motor vehicles to be used in the event the main braking system fails.

Locking devices are commonly used in association with the main braking system in a motor vehicle usually as a means of locking the wheels in place when the vehicle is not in motion. Ordinarily, such devices cannot be activated until the vehicle has stopped or slowed down appreciably, and are therefore of little value if for any reason the main brake system should fail or not properly function. For example, in the larger, heavy-duty vehicles the hydraulic control system may malfunction due to leaks or faulty valving; or the brake shoes may become worn making it difficult if not impossible to effectively brake the vehicle, especially on steep grades or where sudden stopping is required. Accordingly, there is a definite need for an auxiliary braking system which can be separately controlled and activated in place of, or in addition to, the main braking system in a motor vehicle to bring the vehicle to a complete stop and to permit engagement of a locking device.

It is therefore an important object of the present invention to provide for an auxiliary braking and locking device conformable for attachment to automotive vehicles, and which will serve as an effective and reliable means of braking a vehicle and locking it in place independently of the main brake system.

It is another object to provide a vehicle braking and locking device wherein the braking and locking elements can be activated independently of one another and independently of the main brake system while being under the complete control of the operator at all times.

It is a further object to provide an emergency brake and locking device which is compact, rugged and durable in use and is adaptable for mounting either on the drive shaft or wheel axle for rapid and effective braking and locking of a motor vehicle.

It is an additional object of the present invention to provide in combination, for disposition on a rotating member to be braked in a motor vehicle and the like, an emergency brake for remote actuation independently of the vehicle brake system to first stop the vehicle and a locking device for separate and remote actuation to hold the vehicle in place.

This application is a continuation-in-part of my earlier copending United States patent application, Serial No. 143,100, filed Oct. 5, 1961, now abandoned.

The above and other objects, advantages, and features of the present invention will become more readily understood and appreciated from a consideration of the following detailed description taken together with the accompanying drawings in which:

FIGURE 1 is a plan view illustrating a braking and locking device constructed in accordance with the present invention in mounted relation on the drive shaft of a motor vehicle;

FIGURE 2 is an end view with parts broken away showing in detail the relative disposition and arrangement between elements, in accordance with the present invention;

FIGURE 3 is a sectional view taken on line 3—3 of FIGURE 2;

FIGURE 4 is a view partially in section taken on line 4—4 of FIGURE 2; and

FIGURE 5 is a side view of the operating control linkage for the locking assembly of the present invention.

Referring in more detail to the drawings, a preferred form of vehicle braking and locking unit 10 is shown in FIGURE 1 being mounted on drive shaft 12 of a truck T. As illustrated, the truck 12 has a main frame 13, front and rear wheels 14, and an operator control section 15; the drive system for the truck includes the shaft 12 extending rearwardly from transmission housing 16 into a differential 17 for driving rear axle 18 and wheels 14. Although not shown, in accordance with conventional practice, the wheels 14 are equipped with brake drums and brake shoes suitably controlled from the operator section 15 through a remote control system; and it is to be understood at the outset that the device 10 is mounted as a separate assembly and is actuated through separate control means, to be described, independently of the existing brake assembly on the vehicle.

In accordance with the present invention, the device 10 performs the dual function of braking the vehicle and locking the vehicle drive system against movement once stopped. To this end, the device 10 is comprised of an outer stationary casing 22 defining an upper circular rim 23 forming a central opening 24, and a downwardly tapering lower extension 25. One end of the casing is covered by an end plate 26, and the casing and end plate are secured to the end of the transmission housing 16 in concentric relation to the shaft 12 by suitable connecting bolts 28 passed through aligned openings 29. The opposite end of the casing is covered by annular end plate 30 secured in place by connecting bolts 31.

A brake unit 32 and locking gear 33 are mounted within the casing for rotation with the drive shaft 12. The brake unit shown is a hydraulic brake of conventional construction having an outer rotatable brake drum 35, brake shoes 36, and a hydraulic circuit 37. As represented in FIGURES 1 and 4, hydraulic fluid is applied under pressure from master cylinder 38 through control line 39 to cylinders 40 to urge the brake shoes outwardly into frictional engagement with the drum. A brake lever or pedal 41 mounted in the operator control section 15 is connected through a control line 41' to the master cylinder 38 to apply the brake, and it is important to note that the entire brake system 32 as described, including the control circuit 37 is separately installed and controlled by the operator independently of the main brake system for the wheels 14. Of course various brake units may be employed in place of the unit 32 to accomplish the same end, provided that provision can be made for disposition of the unit within the casing 22 with the brake drum, such as the brake drum 35, being secured to the locking gear 33 for rotation on the drive shaft 12.

The locking gear 33 is in the form of a relatively flat annular disk having outer circumferential tooth elements 44, and with the gear being positioned in abutting relation to one end of the drum 35. To secure the drum 35 to the gear, the drum has an inturned flange 45 connected to one side of the gear adjacent to its outer periphery by mounting bolts 46. The drive shaft 12 is divided just exteriorly of the transmission housing and formed with splined end portions 48 on which are positioned correspondingly splined sleeves 49, the sleeves having outer circular connecting flanges 50 for attachment to opposite sides of the gear 33 by bolts 51. In this way, both the drum and gear are firmly secured in keyed relation to the shaft so as to follow the rotation of the shaft; then, in the event that the main brake system should fail to function properly when the vehicle is in motion, the emergency brake unit 32 can be quickly activated by the operator to simultaneously brake the rotation of the brake drum 35 and locking gear 33, and in turn to brake the drive shaft 12 and rear wheels 14 to stop the vehicle.

When the vehicle is at rest, the locking gear and drive shaft 12 may be simultaneously locked against rotation by means of a remote mechanical control including locking member 52 mounted for slidable movement through an upwardly directed radial guideway 53 in the lower extension 25 of the casing opposite the locking gear 33. The member 52 is in the form of an elongated rectangular rack having straight teeth 54 on its upper end surface for intermeshing engagement with the gear teeth 44 on the locking gear. To control movement of the rack into and out of engagement with the gear, the rack has a slotted portion 57 provided with a curved end 58 and opposite sides 59 and 60 diverging away from the curved end 58. A plate 61 is removably positioned between the end plate 26 and the lower extension 25 by connecting bolts 28', the end plate having a relatively wide slot 62 extending across the slotted portion 57 but in an opposite direction and similarly forming a curved end 63 and outwardly divergent sides 64 and 65. It will be noted that the slot 62 is enlarged in relation to the slot 57 and in general is formed to control the movement of a relatively flat elongated lever arm 67 in relation to the slot 57. A cam 68 is welded or otherwise secured to one side of the lever arm 67 for insertion within the slot 57, the cam 68 also being formed with a curved end 70 and divergent sides 71 and 72, and being of reduced size in relation to the slot 57.

The lever arm 67 is pivoted at its inner curved end 74 for limited movement within the enlarged slot 62 about pivot pin 75 from a lower position abutting the side 64 to an upper position abutting the side 65; simultaneously the cam will rock about its curved end 70 to urge the rack upwardly through the guideway into intermeshing engagement with the teeth 44 and with the cam moving from one side 59 to the opposite side 60. Due to the relative disposition of the cam in the slot 57 it will be constrained to move in a vertically upward direction against the upper end of the slot while being limited in movement by the slot 62 so as not to wedge the teeth 54 too tightly against the gear teeth 44. Some play is permitted between the cam and slot to prevent damage to the teeth in the event that the rack is accidentally forced into engagement with the gear when the vehicle is in motion, and in addition a return spring 77 is mounted in the lower portion 25 and is secured to the lower end of the rack 52 to normally hold the rack in a position away from the gear 33, for example as shown in FIGURE 4. By forming the rack 52 and end plate 61 in the manner described it will be seen that the direction of extension of the lever arm 67 away from the casing may be reversed merely by reversing, or flipping over, the rack 52 and plate 61. This will of course depend on the location of the device 10 relative to the operator section 15 in order to most effectively actuate the lever arm 67 from the operator section. In reversed relation, also, it will be noted that a pin receiving bore 75' is formed in the guideway opposite the pivot pin 75, so that the location of the pin 75 and the point of pivotal connection of the lever arm also can be reversed.

Various arrangements may be employed to enable remote control of the lever arm from the operator section and for example, as represented in FIGURE 5, a hand operated control arm 78 has a lower end portion 79 with a horizontal follower rod 80 pivotally secured thereto. In turn, the rod 80 is pivotally secured at its opposite end to the upper end of a fixed pivot link 81, the link being pivotal about a pin 82 positioned at the inner end of a support arm 83 on the vehicle frame, as shown in FIGURE 1. The opposite end of the link has a lost motion slot 84 therein for reception of a pin 85 projecting from the free end of the lever arm 67. When the control handle 78 is retracted, it will cause counterclockwise movement of the pivot link forcing the arm 67 to move upwardly through the slot 62 and to urge the rack into engagement with the gear teeth so as to lock the gear 33 against rotation; and suitable means not shown may be provided to hold the control handle in the retracted, locked position. To release the gear 33, it is merely necessary to move the handle forward so that the lever arm is forced downwardly to withdraw the teeth 54 away from engagement with the gear. Furthermore a compression spring 87 is secured between the follower rod 80 and the link 81 which when the handle 78 is retracted will aid in yieldably urging the rack into engament with the gear. Thus, if the rack teeth are not aligned when the handle is initially retracted, the spring will continue to urge the teeth 54 upwardly against the gear until the gear shifts or moves a sufficient extent for the teeth to move into positive, locking engagement under the influence of the spring 87.

When the truck is in motion, the brake drum and locking gear will be under rotation, and the return spring will normally hold the rack away from accidental engagement with the gear teeth. To stop the vehicle, if for any reason the main braking system should not be functioning, it is merely necessary to first activate the emergency brake unit 32 to force the brake shoes into engagement with the brake drum until the vehicle has come to a stop. Thereafter, the control handle 78 is retracted to urge the rack 52 into engagement with the locking gear 33 thereby locking the gear, brake drum, and drive shaft against rotation, and as a result locking the entire vehicle against movement. Of course, without actuating the emergency brake the locking gear may be locked against rotation any time the vehicle is parked or at rest.

It will be evident that the emergency brake and locking device as described may be positioned at different locations on the vehicle to effectively brake and lock the vehicle in place. For example, it may be positioned just forwardly of the differential, or alternately, a pair of units may be positioned on the rear axle on opposite sides of the differential. Accordingly, it is to be understood that various modifications and changes may be made in the construction and arrangement of parts comprising the present invention without departing from the spirit and scope thereof as defined by the appended claim:

What is claimed is:

A locking device for a rotating shaft on a motor vehicle comprising a stationary casing mounted in outer spaced concentric relation to the rotating shaft, a locking gear keyed for rotation on the rotating shaft within said casing, said gear having outwardly facing circumferential teeth thereon, a locking member for said gear disposed in a guideway in said casing for movement into locking engagement with said gear teeth, said member having a cam-receiving slot therein, a locking control lever disposed for limited movement in a slot in said casing opposite said cam-receiving slot, and a cam on said control lever being removably disposed in said cam-receiving slot and being responsive to movement of said control lever to urge said locking member into and out of engagement with said gear teeth, said locking member being defined by a rack with said cam-receiving slot having a curved end surface and divergent sides extending transversely of said guideway, said rack being reversibly disposed in said guideway for extension of said cam receiving slot alternately in either transverse direction across said guideway, and said cam having a correspondingly curved end and divergent sides for rocking engagement within said cam-receiving slot in moving said rack into and out of engagement with said gear teeth, said control lever extending transversely in a direction away from said cam and said cam-receiving slot according to the transverse direction of extension of said cam-receiving slot in relation to said guideway.

References Cited by the Examiner

UNITED STATES PATENTS

| | | | |
|---|---|---|---|
| 660,197 | 10/1900 | McSherry | 74—107 |
| 1,281,530 | 10/1918 | DeSoto | 188—31 |
| 1,322,171 | 11/1919 | Wherry. | |
| 1,827,256 | 10/1931 | Obidine | 188—106 |
| 2,146,159 | 2/1939 | Scherer | 188—106 |
| 2,252,618 | 8/1941 | Campbell. | |

FOREIGN PATENTS 699,701   11/1953   Great Britain.

FERGUS S. MIDDLETON, *Primary Examiner.*

EUGENE G. BOTZ, ARTHUR L. LA POINT,
*Examiners.*